US010464402B2

(12) United States Patent
Salter et al.

(10) Patent No.: US 10,464,402 B2
(45) Date of Patent: Nov. 5, 2019

(54) PICKUP TONNEAU COVER

(71) Applicant: Ford Global Technologies, LLC, Dearborn, MI (US)

(72) Inventors: Stuart C. Salter, White Lake, MI (US); Christopher Anthony Danowski, Rochester Hills, MI (US); Paul Kenneth Dellock, Northville, MI (US); David Brian Glickman, Southfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 40 days.

(21) Appl. No.: 15/827,636

(22) Filed: Nov. 30, 2017

(65) Prior Publication Data
US 2019/0160925 A1 May 30, 2019

(51) Int. Cl.
B60J 7/14 (2006.01)
B60Q 3/30 (2017.01)
B32B 27/30 (2006.01)
C09K 11/02 (2006.01)

(52) U.S. Cl.
CPC ............ *B60J 7/141* (2013.01); *B32B 27/308* (2013.01); *B60Q 3/30* (2017.02); *C09K 11/02* (2013.01)

(58) Field of Classification Search
CPC ........ B60J 7/141; B32B 27/308; C09K 11/02; B60Q 3/30
See application file for complete search history.

(56) References Cited

U.S. PATENT DOCUMENTS

| 6,116,761 A * | 9/2000 | Munsey | B60Q 3/30 362/296.01 |
| 6,406,169 B1 | 6/2002 | Munsey | |
| 6,832,803 B2 | 12/2004 | Elliott | |
| 2002/0007888 A1* | 1/2002 | Gregorek | B60J 11/00 150/166 |

FOREIGN PATENT DOCUMENTS

| CN | 204605816 U | 9/2015 |
| CN | 205022081 U | 2/2016 |
| JP | 3068642 U | 7/1991 |

OTHER PUBLICATIONS

LumiGram® Light for Style, Home, Catalog, Online Store, 94054099, L24—Luminous Bed Cover (fiber optic fabric).

* cited by examiner

Primary Examiner — D Glenn Dayoan
Assistant Examiner — Melissa Ann Bonifazi
(74) Attorney, Agent, or Firm — Carlson, Gaskey & Olds, P.C.

(57) ABSTRACT

A tonneau cover assembly includes at a luminescent layer that emits visible light responsive to exposure to light, a top clear layer above the luminescent layer, and a bottom clear layer below the luminescent layer. The luminescent layer illuminates a portion of a cargo area covered by the tonneau cover.

18 Claims, 2 Drawing Sheets

PICKUP TONNEAU COVER

TECHNICAL FIELD

This disclosure relates to tonneau cover for a pickup truck that includes features for providing passive lighting within a covered cargo area.

BACKGROUND

A cargo bed of a pickup truck is often covered with a tonneau cover. The tonneau cover protects and secures objects in the cargo bed. The tonneau cover blocks light and therefore creates difficulties seeing and accessing objects within the cargo bed. The difficulties are increased at night when ambient light is not available. Electric lights in the cargo bed can be utilized, but add additional parts and complexity. Moreover even with lights within the cargo bed visibility may be difficult in some parts of the cargo bed. Removing the cover permits easier viewing of objects within the cargo bed, but may not be the most expedient nor desired means of accessing objects from within the cargo bed.

SUMMARY

A tonneau cover assembly according to an exemplary aspect of the present disclosure includes, among other things at least one panel for covering at least a portion of a cargo bed. The at least one panel includes a luminescent layer that emits visible light responsive to exposure to light, a top clear layer above the luminescent layer, and a bottom clear layer below the luminescent layer.

In a further non-limiting embodiment of the foregoing tonneau cover assembly, a partially reflective layer disposed between the top clear layer and the luminescent layer, the reflective layer blocking a portion of light communicated through the top clear layer to the luminescent layer and reflecting a portion of light emitted from the luminescent layer through the bottom clear layer.

In a further non-limiting embodiment of any of the foregoing tonneau cover assemblies, the reflective layer includes a metallized layer partially reflecting a greater portion of light back through the top clear layer than to through to the luminescent layer.

In a further non-limiting embodiment of any of the foregoing tonneau cover assemblies, the portion of light reflected back through the top clear layer is about 90% of light received on the cover assembly.

In a further non-limiting embodiment of any of the foregoing tonneau cover assemblies, the top clear layer includes an ultraviolet stabilizer that blocks light within a defined range of wavelengths.

In a further non-limiting embodiment of any of the foregoing tonneau cover assemblies, the ultraviolet stabilizer blocks ultraviolet light below a wavelength of 360 nm.

In a further non-limiting embodiment of any of the foregoing tonneau cover assemblies, the luminescent layer includes a phosphorescent paint.

In a further non-limiting embodiment of any of the foregoing tonneau cover assemblies, the phosphorescent paint is between 0.005 (0.127 mm) and 0.020 inches (0.508 mm) thick.

In a further non-limiting embodiment of any of the foregoing tonneau cover assemblies, the top clear coat is acrylic.

In a further non-limiting embodiment of any of the foregoing tonneau cover assemblies, the at least one panel is a rigid panel.

In a further non-limiting embodiment of any of the foregoing tonneau cover assemblies, the at least one panel is flexible material.

A method of fabricating a tonneau cover according to an exemplary aspect of the present disclosure includes, among other things applying a luminescent layer that emits visible light responsive to exposure to light to a top clear layer. A bottom clear layer is applied below the luminescent layer.

In a further non-limiting embodiment of the foregoing method, applying partially reflective layer between the luminescent layer and the bottom clear layer and blocking a portion of light communicated through the top clear layer to the luminescent layer and reflecting a portion of light emitted from the luminescent layer through the bottom clear layer with the partially reflective layer.

In a further non-limiting embodiment of any of the foregoing methods, blocking about 90% of light received on the cover assembly from being communicated to the luminescent layer with the partially reflective layer.

In a further non-limiting embodiment of any of the foregoing methods, the top clear layer includes an ultraviolet stabilizer that blocks light within a defined range of wavelengths.

In a further non-limiting embodiment of any of the foregoing methods, the luminescent layer includes a phosphorescent paint and applying the luminescent layer comprises applying the phosphorescent paint in a layer between 0.005 (0.127 mm) and 0.020 inches (0.508 mm) thick.

The various features and advantages of this disclosure will become apparent to those skilled in the art from the following detailed description. The drawings that accompany the detailed description can be briefly described as follows.

DETAILED DESCRIPTION

Figure 1:
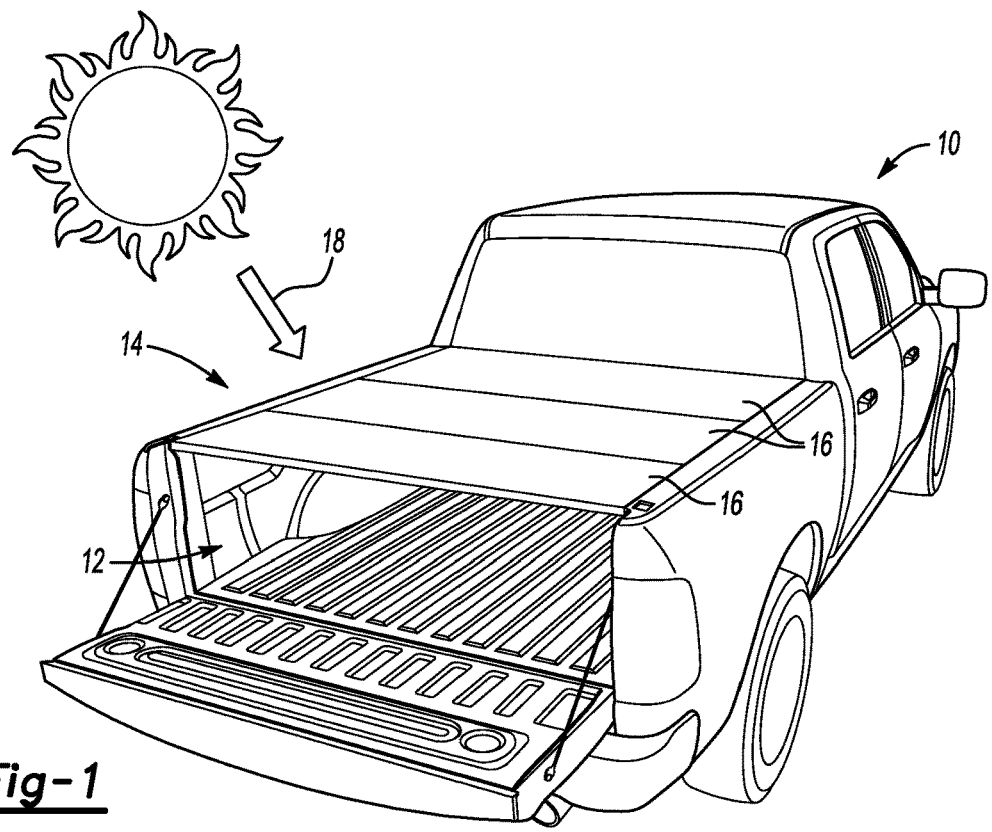
FIG. 1 is a schematic view of an example tonneau cover exposed to sunlight.

Referring to FIG. 1, a motor vehicle 10 includes a cargo area 12 that is covered by a tonneau cover 14. The example tonneau cover 14 includes a plurality of panels 16 that extend across a top of the cargo area 12 to secure and protect items stored within the cargo area. The example tonneau cover 14 includes features that absorb ultraviolet light 18 from the sun or other origins and emits that light to illuminate the cargo area 12.

Figure 2:
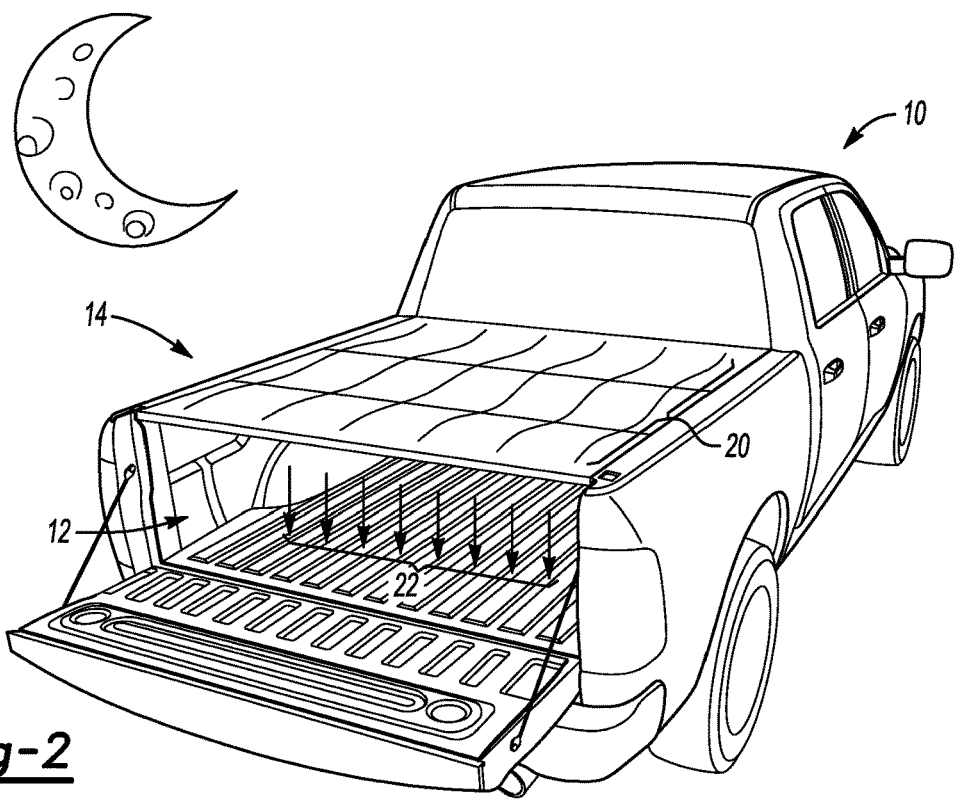
FIG. 2 is the example tonneau cover at night.

Referring to FIG. 2 with continued reference to FIG. 1, the example tonneau cover 14 includes features that absorb ultraviolet light form the sun or other sources of and emit light schematically indicated at 22 into the cargo area 12. Luminescent elements within the tonneau cover 14 continually emit light 22 into the cargo area 12. During the night, the contrast with the darkened environment and the emitted light 22 provides a greater visible impression that can in seeing objects within the cargo area 12. Moreover, the example tonneau cover 14 may emit a portion of light, schematically shown at 20, to generate a glowing appearance visible through a top surface of the tonneau cover 14. Accordingly, the example tonneau cover 14 includes elements that absorb light and then emit that light 22 within the cargo area 12 to aid in finding and viewing objects within the cargo area covered by the tonneau cover 14. It should be appreciated that absorption and emission of light include processes as understood by those skilled in the art that apply to materials that are energized by exposure to light and provide a visual appearance of light emission.

Figure 3:
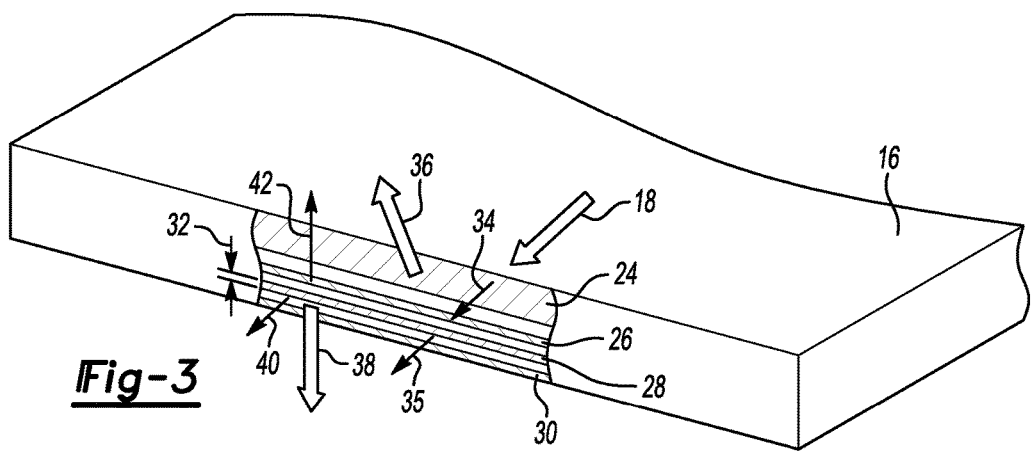
FIG. 3 is a schematic view of layers of any example tonneau cover embodiment.

Referring to FIG. 3 with continued reference to FIGS. 1 and 2, the example tonneau cover 14 includes a plurality of panels 16. Although several panels 16 are shown, more panels 16 could be utilized and are within the contemplation of this disclosure. Moreover, one panel 16 could also be utilized and is also within the contemplation of this disclosure.

One of the panels 16 is schematically shown in cross-section in FIG. 3 and includes a plurality of layers. It should be understood that although a rigid panel 16 is illustrated in FIG. 3, the tonneau cover 14 could also be a single flexible piece of material.

The example panel 16 includes a top layer 24 that is at least partially transparent to communicate ultraviolet light to layers disposed therein. Attached, applied or suspended below a bottom surface of the top layer 24 is a reflective layer 26. Attached, applied or suspended below the reflective layer 26 is a luminescent layer 28. A bottom layer 30 is provided at a bottom surface of the panel 16 below the luminescent layer 28.

The top, clear layer 24 may be a clear polymer and it may also be of an acrylic material to provide a more stiff rigid structure. The top, clear layer 24 defines the top surface of the panel 16 and may include ultraviolet stabilizers to block portions of light rays transmitted through the layers to the luminescent layers 28.

The luminescent layer 28 absorbs light 18 from an outside source such as the sun and emits light 38. The luminescent layer 28 will continue emitting light as schematically shown at 38 for a period of time once exposure to the light 18 stops, such as for example at night. Accordingly, the luminescent layer 28 is excited or charged by the exposure of ultraviolet light 18 such as from the sun and later will emit light schematically illustrated at 38 for a duration of time in the absence of applied light 18.

The example luminescent layer 28 is a long persistence phosphorescent coating or paint and is provided at a thickness 32 of approximately 0.012 inches (0.305 mm). In another disclosed example the thickness of the luminescent layer is between 0.005 (0.127 mm) and 0.020 inches (0.508 mm). Although an example range of thicknesses is provided by way of example, other thicknesses are possible and within the contemplation of this disclosure.

The top layer 24 may include an ultraviolet stabilizer that cuts down portions of ultraviolet light but allows ranges of ultraviolet light that are understood to excite and charge the luminescent layers 28. In one example, the top layer 24 includes an ultraviolet stabilizer that is intended to block ultraviolet light below wavelengths of 360 nm. In most instances, the luminescent layer 28 is properly charged with light of wavelengths above 350 nm to around 420 nm. It should be appreciated that different materials and types of material utilized for the luminescent layer 28 may charge at different wavelengths and fall within the contemplation of this disclosure.

In this example, the luminescent layer 28 is a phosphorous paint of a desired color. As appreciated, the color can be selected from any of a plurality of colors to provide a desired light characteristic within the cargo area 12. Moreover, the color of the luminescent layer 28 may also be selected to highlight a desired aesthetic appearance of the vehicle 10.

The luminescent layer 28 will emit light 38 in all directions. Most of the light 38 is communicated into the cargo area 12 with the reflective layer 26 provided between the luminescent layer 28 and the top clear layer 24. The reflective layer 26 directs a portion of light schematically shown at 40 emitted from the luminescent layer 28 downward into the cargo area 12. Light emitted from the luminescent layer 28 is mostly emitted downward as is indicated by arrow 38. A much smaller portion of light schematically indicated by arrow 42 is emitted upward through the reflective layer 26.

The example reflective layer 26 is partially transparent so that it enables absorption of a portion of light 18 to be communicated through the top, clear layer 24. The partial transparency can be provided by defining the reflective layer with a defined thickness. Moreover, partial transparency can be defined by application in only designated areas or with certain open areas. The example reflective layer 26 is formed from a reflective metallized material. The example material is formed utilizing a partial vacuum metallization process that provides a layer that reflects approximately 90% of light 18. The amount of light reflected can be varied depending on the type and process utilized to form the reflective layer 26. Although the reflective layer 26 is disclosed by way of example as being metalized, other reflective materials could be utilized and are within the contemplation of this disclosure.

As is schematically illustrated, light impinging on a top layer 24 will proceed through the top clear layer 24 and a portion of that light is reflected upward back through the top layer 24 as is indicated by arrow 36. Another portion of that light indicated by arrow 34 will proceed through the partial reflective layer 26 to charge the luminescent layer 28. In this example, the reflective layer 26 blocks approximately 90% of the light 18 impinging on the panel 16. The remaining 10% passes through the reflective layer 26 to excite and charges the luminescent layer 28.

Moreover, a portion schematically shown at 35 of the light 18 may be transmitted directly through the panel 16 into the cargo area 12 to further illuminate the covered cargo area 12.

Figure 4:
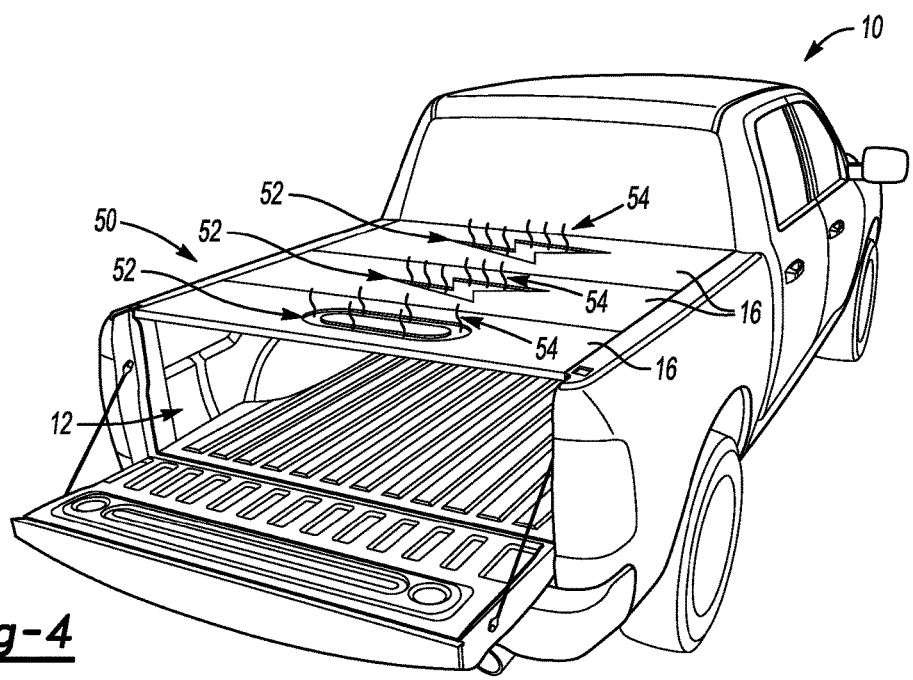
FIG. 4 is another example tonneau cover including a visible luminescent design.
Figure 5:
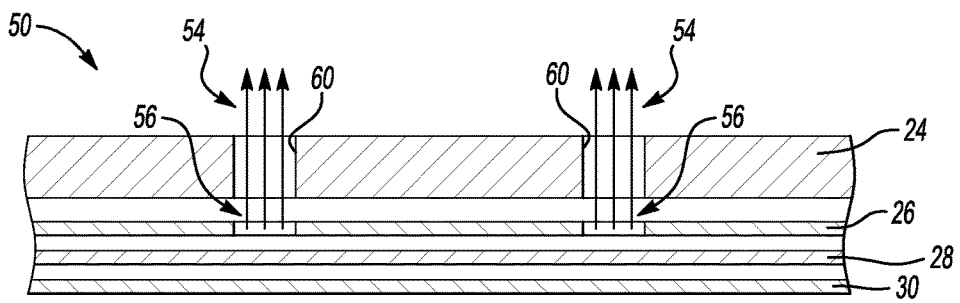
FIG. 5 is a schematic view of layers of the example tonneau cover embodiment shown in FIG. 4.

Referring to FIGS. 4 and 5, another example tonneau cover 50 is shown and includes designs 52 that provide an illuminated appearance to provide a desired aesthetic. In this example the designs 52 include lightning bolts and an oval, however any design could be crafted and utilized within the contemplation of this disclosure. The designs 52 are defined with openings 56 in the reflective layer 26 that correspond with clear areas 60 within the top layer 24 that enable visible light 54 through the top of the cover 50. The openings 56 are provided in a desired shape to define the visible designs 52. The corresponding areas 60 align with the openings 56 and are of a material that allows an increased transmission of light as compared to surrounding area so the top layer 24. The areas 60 can be clear material or a permeable chrome. Moreover, the areas 60 can be tinted to define a desired color or other aesthetically desired appearance. Additionally, the areas 60 can be of any material that enables light from the luminescent layer 28 to be visible through the top of the cover 50. Although lightning bolts and an oval are shown by way of example, the designs may also include letters, logos, or any other shapes that provide the desired aesthetic appearance.

Accordingly, the example tonneau covers 14, 50 includes a layer of luminescent material that generates passive light without additional structures or energy to aid in viewing of objects within the cargo area 12.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A tonneau cover assembly comprising:
at least one panel for covering at least a portion of a cargo bed, the at least one panel including a luminescent layer that emits visible light responsive to exposure to light, a top clear layer above the luminescent layer, and a bottom clear layer below the luminescent layer, wherein the top clear layer includes an ultraviolet stabilizer that blocks light within a defined range of wavelengths.

2. The tonneau cover assembly as recited in claim 1, including a reflective layer disposed between the top clear layer and the luminescent layer, the reflective layer blocking a portion of light communicated through the top clear layer to the luminescent layer and reflecting a portion of light emitted from the luminescent layer through the bottom clear layer.

3. The tonneau cover assembly as recited in claim 2, wherein the reflective layer includes openings defining a design, wherein light from the luminescent layer is visible through the openings defining the design and the top clear layer.

4. The tonneau cover assembly as recited in claim 2, wherein the reflective layer comprises a metallized layer partially reflecting a greater portion of light back through the top clear layer than to through to the luminescent layer.

5. The tonneau cover assembly as recited in claim 1, wherein the portion of light reflected back through the top clear layer is about 90% of light received on the cover assembly.

6. The tonneau cover assembly as recited in claim 1, where the ultraviolet stabilizer blocks ultraviolet light below a wavelength of 360 nm.

7. The tonneau cover assembly as recited in claim 1, wherein the luminescent layer comprises a phosphorescent paint.

8. The tonneau cover assembly as recited in claim 7, wherein the phosphorescent paint is between 0.005 (0.127 mm) and 0.020 inches (0.508 mm) thick.

9. The tonneau cover assembly as recited in claim 1, wherein the top clear coat is acrylic.

10. The tonneau cover assembly as recited in claim 1, wherein the at least one panel is a rigid panel.

11. The tonneau cover assembly as recited in claim 1, wherein the at least one panel is flexible material.

12. A method of fabricating a tonneau cover comprising:
applying a luminescent layer that emits visible light responsive to exposure to light to a top clear layer, wherein the top clear layer includes an ultraviolet stabilizer that blocks light within a defined range of wavelengths; and
applying a bottom clear layer below the luminescent layer.

13. The method as recited in claim 12, including applying partially reflective layer between the luminescent layer and the bottom clear layer and blocking a portion of light communicated through the top clear layer to the luminescent layer and reflecting a portion of light emitted from the luminescent layer through the bottom clear layer with the partially reflective layer.

14. The method as recited in claim 13, including blocking about 90% of light received on the cover assembly from being communicated to the luminescent layer with the partially reflective layer.

15. The method as recited in claim 12, wherein the luminescent layer comprises a phosphorescent paint and applying the luminescent layer comprises applying the phosphorescent paint in a layer between 0.005 (0.127 mm) and 0.020 inches (0.508 mm) thick.

16. A tonneau cover assembly comprising:
at least one panel for covering at least a portion of a cargo bed, the at least one panel including a luminescent layer that emits visible light after being charged responsive to exposure to light, a top clear layer above the luminescent layer, a bottom clear layer below the luminescent layer and a reflective layer disposed between the top clear layer and the luminescent layer, wherein the reflective layer is configured to block a portion of light communicated through the top clear layer to the luminescent layer and reflect a portion of light emitted from the luminescent layer through the bottom clear layer.

17. The tonneau cover assembly as recited in claim 16, wherein the reflective layer includes openings defining a design, wherein light from the luminescent layer is visible through the openings defining the design and the top clear layer.

18. The tonneau cover assembly as recited in claim 16, wherein the reflective layer comprises a metallized layer partially reflecting a greater portion of light back through the top clear layer than to through to the luminescent layer.

* * * * *